United States Patent
Junhai

(10) Patent No.: US 9,033,001 B2
(45) Date of Patent: May 19, 2015

(54) WATER DIVIDER

(71) Applicant: Beijing Kohler Ltd., Beijing (CN)

(72) Inventor: Jin Junhai, Beijing (CN)

(73) Assignee: BEIJING KOHLER LTD. (CN)

( * ) Notice: Subject to any disclaimer, the term of this patent is extended or adjusted under 35 U.S.C. 154(b) by 35 days.

(21) Appl. No.: 13/791,768

(22) Filed: Mar. 8, 2013

(65) Prior Publication Data

US 2013/0269788 A1   Oct. 17, 2013

(30) Foreign Application Priority Data

Apr. 17, 2012  (CN) .................... 2012 2 0164091 U

(51) Int. Cl.
  F16K 11/02  (2006.01)
  F16K 11/06  (2006.01)
  F16K 11/074  (2006.01)
(52) U.S. Cl.
  CPC ............... F16K 11/02 (2013.01); F16K 11/06 (2013.01); F16K 11/0746 (2013.01)
(58) Field of Classification Search
  CPC ........................................... F16K 11/02
  USPC ............. 137/625.31, 625.46, 625.13, 625.47
  See application file for complete search history.

(56) References Cited

U.S. PATENT DOCUMENTS

| | | | |
|---|---|---|---|
| 2,162,236 A | 6/1939 | Williams | |
| 5,022,429 A * | 6/1991 | Rollini et al. | 137/218 |
| 5,385,472 A | 1/1995 | Mullin | |
| 5,701,934 A * | 12/1997 | Kuran et al. | 137/625.46 |
| 5,901,387 A * | 5/1999 | Fan | 4/675 |
| 6,237,622 B1 * | 5/2001 | Cook et al. | 137/270 |
| 6,959,731 B2 * | 11/2005 | Bartkus et al. | 137/625.46 |
| 7,409,968 B2 | 8/2008 | Yang | |
| 8,695,635 B1 * | 4/2014 | Wang | 137/625.17 |
| 2012/0145810 A1 * | 6/2012 | Zhou et al. | 239/443 |
| 2013/0269788 A1 | 10/2013 | Junhai | |

FOREIGN PATENT DOCUMENTS

| | | |
|---|---|---|
| CN | 1749677 | 3/2006 |
| CN | 2816553 | 9/2006 |
| CN | 101907320 | 12/2010 |
| CN | 201672618 | 12/2010 |
| DE | 34 25 315 | 9/1990 |
| EP | 0 841 101 | 5/1998 |

* cited by examiner

Primary Examiner — John K Fristoe, Jr.
Assistant Examiner — Christopher Ballman
(74) Attorney, Agent, or Firm — Foley & Lardner LLP

(57) ABSTRACT

A water divider includes a water divider shell with openings formed on two ends and sides. A fixed water dividing device and a rotated water dividing device are provided within the water divider shell. A first through hole extends between the side and the bottom end of the fixed water dividing device, the side through hole opening position of the first through hole corresponds to the position of the opening provided on the side of the water divider shell. A second through hole extends between the top end and the bottom end of the fixed water dividing device, the top end through hole opening of the second through hole corresponds to the top end opening of the water divider shell. The rotated water dividing device includes a third though hole having a through hole opening that corresponds to the bottom end opening of the water divider shell.

19 Claims, 2 Drawing Sheets

007
WATER DIVIDER

CROSS-REFERENCE TO RELATED PATENT APPLICATIONS

This application claims priority to China P.R. Application No. 201220164091.9, filed Apr. 17, 2012 including the specification, drawings, claims and abstract, and is incorporated herein by reference in its entirety.

FIELD

The present utility model relates to the field of heating and plumbing technologies and in particular to a water divider.

BACKGROUND

Typically, known shower heads have two shower options: a handheld shower and a top mount shower. Under either option the hot water and cold water are mixed to provide a mixed water, and the mixed water is divided into two paths as controlled by a dual-function water divider disposed inside the shower head, and the flow direction of the mixed water can be controlled by adjusting valves on the two water paths inside the dual-function water divider.

However, the known dual-function water divider typically cannot be installed parallel to the water supply pipe, has a relatively complex structure, and has a large size. The adoption of a water divider having such a structure tends to make the structure design of the shower head complex, and moreover, adversely affects the overall appearance of the shower head.

SUMMARY

According to one embodiment, a water divider has a simple structure and an installation direction parallel to the water supply pipe, and can make heating and plumbing parts using the water divider tidier and more aesthetically attractive.

According to another embodiment, a water divider includes a water divider shell, with openings formed on two ends and sides of the water divider shell. A fixed water dividing device and a rotated water dividing device closely attached to a bottom end of the fixed water dividing device are disposed inside the water divider shell. At least one first through hole is disposed between the side and the bottom end of the fixed water dividing device, the side through hole opening position of the first through hole corresponds to the position of the opening disposed on the side of the water divider shell. At least one second through hole is disposed between the top end and the bottom end of the fixed water dividing device, the top end through hole opening of the second through hole corresponds to the top end opening of the water divider shell. At least one third through hole is disposed on the rotated water dividing device, the bottom end through hole opening of the third through hole corresponds to the bottom end opening of the water divider shell, and when the rotated water dividing device rotates, the third through hole is open to the first through hole or open to the second through hole.

According to another embodiment, a fixing device is disposed at the top end of the fixed water dividing device for fixing the fixed water dividing device inside the water divider shell, and a rotating device is disposed at the bottom end of the rotated water dividing device for driving the rotated water dividing device to rotate inside the water divider shell. The rotating device includes a rotated base latched to the bottom end of the rotated water dividing device. A fourth through hole is disposed between the top and bottom ends of the rotated base. A limiting block is disposed at the side of the rotated base, an aperture is formed on the water divider shell and the limiting block extends through the aperture and is exposed outside of the water divider shell. A rotation handle is disposed external of the water divider shell, and the rotation handle is latched with the portion of the limiting block that is exposed outside of the water divider shell. The fixed water dividing device and the rotated water dividing device may be made of a ceramic material.

According to a further embodiment, the fixing device includes a fixed base latched to the top end of the fixed water dividing device, the fixed base is latched to the inner surface of the water divider shell, and a fifth through hole is disposed between the top and bottom ends of the fixed base.

According to another embodiment, the water divider shell is a hollow cylinder, the rotation handle is fitted externally over the water divider shell, and a gasket is disposed at the bottom and top ends of the rotation handle, respectively. The area of the water divider shell in which the rotation handle is disposed has a diameter smaller than other areas of the water divider shell, the surface of the rotation handle forms a smooth integral structure with the surfaces of other areas of the water divider shell, and a nut is disposed at the bottom end of the rotation handle for fixing the rotation handle external to the water divider shell, and the nut is connected to the external surface of the water divider shell via threads.

According to a further embodiment, a water divider connector is provided, where a bottom end of the water divider connector is formed with threads, and the bottom end of the water divider connector is connected to the inner surface of the water divider shell via threads.

A first seal ring is disposed between the rotated water dividing device and the rotated base, a second seal ring is disposed between the fixed water dividing device and the fixed base, and a third seal ring is disposed between the nut and the water divider shell.

According to one embodiment of the present disclosure, the entire water divider part is disposed inside the water divider shell, the water outlet on the top end and the water outlet on the side of the water divider can be turned on and closed, respectively, by rotating the rotated water dividing device in the water divider shell, the entire water divider shell has a flow-through structure, water enters the bottom end of the water divider and flows out from the water outlet on the top end and the water outlet on the side of the water divider, its structure is relatively simple and the size is relatively small, the installation direction is parallel to the water supply pipe, and can be installed on a 'regular' sized water pipe and can be used in various water division applications.

BRIEF DESCRIPTION OF THE DRAWINGS

To further clearly describe embodiments of the present disclosure, the drawings to be used to describe the embodiments will be briefly described. It is apparent that the drawings described below illustrate only some embodiments of the present disclosure. Those skilled in the art may obtain other drawings according to these drawings without making innovative effort.

DETAILED DESCRIPTION

The illustrated embodiments of the present disclosure will be clearly, fully described below with reference to the accompanying drawings. The embodiments to be described are only a part of, and not necessarily all of, the embodiments of the present disclosure. All other embodiments obtained by those skilled in the art based on the embodiments of the present disclosure without making innovative effort are intended to be encompassed by the present disclosure.

Referring to the Figs. the present disclosure provides a water divider and relates to the field of heating and plumbing technologies. Its structure is relatively simple and the installation direction is substantially parallel to the water supply pipe. By using the water divider, heating and plumbing parts are tidier and more aesthetically attractive. The water divider includes a water divider shell, with openings are formed on two ends and sides of the water divider shell. A fixed water dividing device and a rotated water dividing device closely attached to the bottom end of the fixed water dividing device are disposed inside the water divider shell. At least one first through hole is disposed between the side and the bottom end of the fixed water dividing device, at least one second through hole is disposed between the top end and the bottom end of the fixed water dividing device, at least one third through hole is disposed on the rotated water dividing device, and when the rotated water dividing device rotates, the third through hole is open to the first through hole or open to the second through hole.

Figure 1:
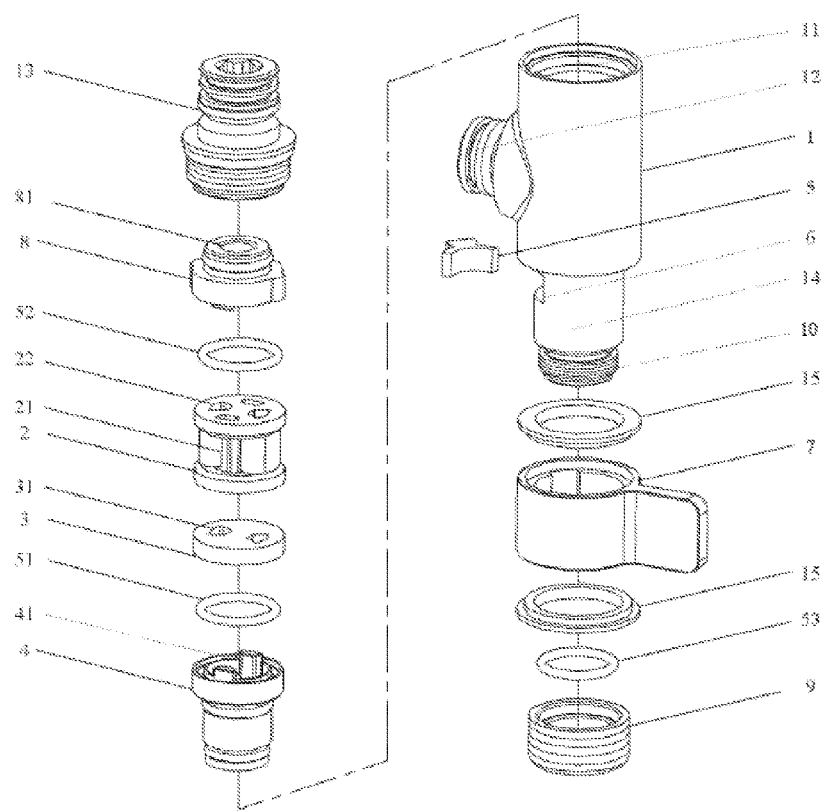
FIG. 1 illustrates an exploded perspective view of the structure of a water divider according to an exemplary embodiment.
Figure 2:
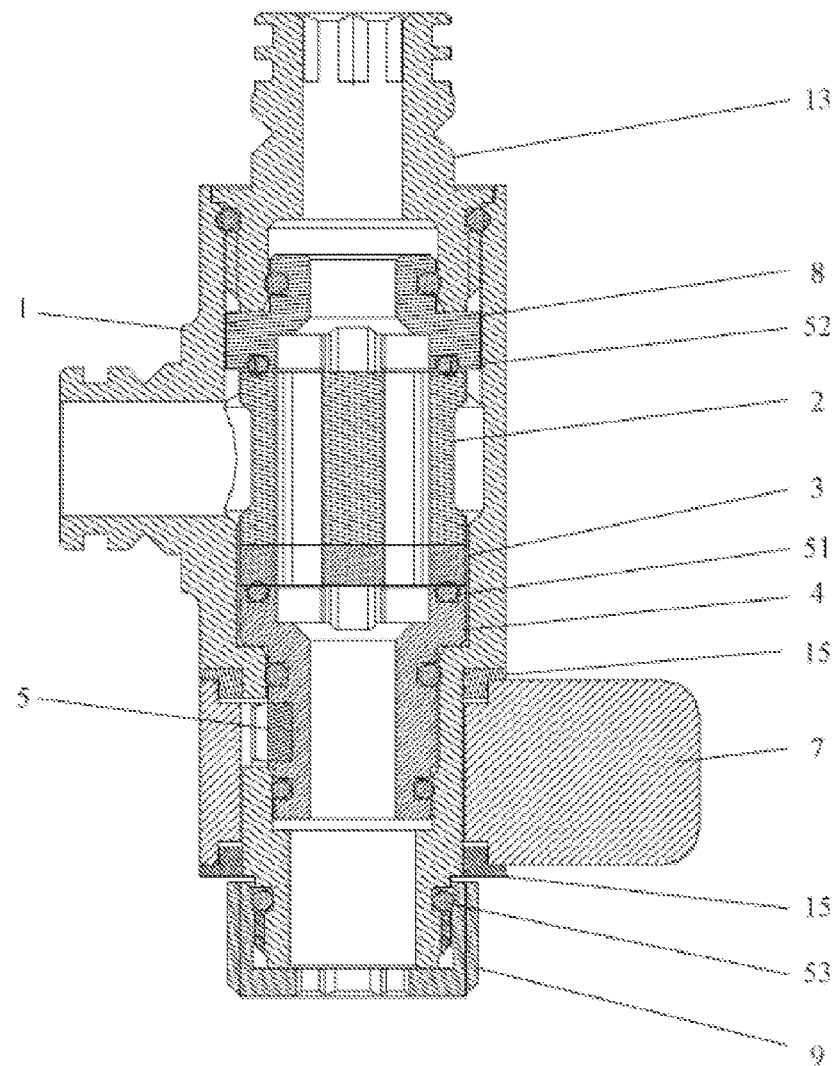
FIG. 2 illustrates an assembled cross-sectional view of the structure of the water divider according to the embodiment of FIG. 1.

Referring to FIGS. 1 and 2 a water divider is shown according to an exemplary embodiment. The water divider includes a water divider shell 1, and openings are formed on two ends and sides of the water divider shell 1. A fixed water dividing device 2 and a rotated water dividing device 3 closely attached to the bottom end of the fixed water dividing device 2 are disposed inside the water divider shell 1. At least one first through hole 21 is disposed between the side and the bottom end of the fixed water dividing device 2, the side through hole opening position of the first through hole 21 corresponds to the position of the opening 12 disposed on the side of the water divider shell. At least one second through hole 22 is disposed between the top end and the bottom end of the fixed water dividing device 2, the top end through hole opening of the second through hole 22 corresponds to the top end opening 11 of the water divider shell. At least one third through hole 31 is disposed on the rotated water dividing device 3, the bottom end through hole opening of the third through hole 31 corresponds to the bottom end opening 10 of the water divider shell, and when the rotated water dividing device rotates, the third through hole 31 is open to the first through hole 21 or open to the second through hole 22.

The top end of the water divider is shown as the top side of the shell 1 in FIG. 1. Since the fixed water dividing device 2 is closely attached to the rotated water dividing device 3 and both are formed with holes, the combination of the fixed water dividing device 2 and the rotated water dividing device 3 operate as a valve. The fixed water dividing device 2 is fixed inside the water divider shell 1 and is configured so that it does not rotate, and the rotated water dividing device 3 can rotate inside the water divider shell 1. When the rotated water dividing device 3 rotates, the third through hole 31 thereon can rotate to the position of the first through hole 21 or the second through hole 22 disposed on the fixed water dividing device 2, which are aligned. At this time, liquid can flow through the first through hole 21 to the side opening 12 of the water divider shell 1 or through the second through hole 22 to the top opening 11 of the water divider shell 1, thereby attaining the goal of water division.

According to the illustrated embodiments of the present disclosure, the entire water divider part is disposed inside the water divider shell, and the water outlet on the top end and the water outlet on the side of the water divider can be turned on and closed, respectively, by rotating the rotated water dividing device in the water divider shell, the entire water divider shell has a flow-through structure, in which water enters the bottom end of the water divider and flows out from the water outlet on the top end and/or the water outlet on the side of the water divider. Its structure is intended to be relatively simple and the small in size, with the installation direction being substantially parallel to a corresponding water supply pipe. Upon installation on a suitably-sized water pipe, it can be used in various water division applications.

Referring further to FIGS. 1 and 2, a fixing device is shown according to an exemplary embodiment as disposed at the top end of the fixed water dividing device 2 for fixing the fixed water dividing device inside the water divider shell 1. A rotating device is disposed at the bottom end of the rotated water dividing device 3 for driving the rotated water dividing device 3 to rotate inside the water divider shell 1. The rotating device is shown to include a rotated base 4 latched to the bottom end of the rotated water dividing device 3. A latching groove is disposed on the rotated water dividing device 3, and a latch is disposed on the rotated base 4, so that the rotated base 4 is latched at the bottom end of the rotated water dividing device 3. A fourth through hole 41 is disposed between the top and bottom ends of the rotated base 4, so that the fourth through hole 41 guides the water that enters the bottom end opening 10 of the water divider shell 1 to the third through hole 3 of the rotated water dividing device 3. A limiting block 5 is disposed at the side of the rotated base 4, and an aperture 6 is formed on the water divider shell 1. The limiting block 5 extends through the aperture 6 and is exposed outside of the water divider shell 1. The limiting block 5 can drive the rotated base 4 to rotate along the aperture 6. A rotation handle 7 is disposed to the external of the water divider shell 1, and the rotation handle 7 is latched with the portion of the limiting block 5 that is exposed outside of the water divider shell 1. When the water divider is used, the rotation handle 7 may be rotated to drive the limiting block 5 to rotate, which further drives the rotated base 4 and the rotated water dividing device 3 to rotate, thereby attaining the goal of water division. The rotation handle 7 can be designed in various shapes according to the specific applications of the water divider, thereby making it more convenient to use.

Referring further to FIGS. 1 and 2, the fixing device according to the illustrated embodiment is shown to include a fixed base 8 latched to the top end of the fixed water dividing device 2. A latching groove is disposed on the fixed water dividing device 2, and a latch is disposed on the fixed base 8. The fixed base 8 is latched to the top end of the fixed water dividing device 2, and the fixed base 8 is latched to the inner surface of the water divider shell 1. A fifth through hole 81 is disposed between the top and bottom ends of the fixed base 8, and the water flowing out of the second through hole 22 flows out of the top end opening 11 of the water divider through the fifth through hole 81.

According to one embodiment, the water divider shell 1 comprises a substantially hollow cylinder, and the rotation handle 7 is fitted over the external of the water divider shell 1. A gasket 15 is disposed at the bottom and top ends of the rotation handle 7, respectively, and the area 14 of the water divider shell 1 in which the rotation handle 7 is disposed has a diameter smaller than other areas of the water divider shell 1. When the rotation handle 7 is fitted over the area, the surface of the rotation handle 7 forms a smooth integral structure with the surfaces of other areas of the water divider shell 1, which does not affect the overall shape of the water divider, because the thickness of the rotation handle 7 is generally the same as the difference between the radius of other areas of the water divider shell 1 and the radius of the area 14 disposed with the rotation handle 7. A nut 9 is disposed at the bottom end of the rotation handle 7 for fixing the rotation handle 7 to the external of the water divider shell 1, the nut 9 is connected to the external surface of the water divider shell 1 via threads, and the rotation handle 7 is sandwiched between the nut 9 and the area of the water divider shell 1 that is not disposed with the rotation handle 7.

Referring further to FIGS. 1-2 a water divider connector 13 is shown according to an exemplary embodiment. The bottom end of the water divider connector 13 is formed with threads, and the bottom end of the water divider connector 13 is connected to the inner surface of the water divider shell 1 via the threads. The top end of the water divider connector 13 can be directly inserted into the external water pipe and open to the external pipe, such that the water divided from the second through hole 22 on the fixed water dividing device 2 flows to the external water pipe through the water divider connector 13. A first seal ring 51 is disposed between the rotated water dividing device 3 and the rotated base 4, a second seal ring 52 is disposed between the fixed water dividing device 2 and the fixed base 8, and a third seal ring 53 is disposed between the nut 9 and the water divider shell 1.

According to any exemplary embodiment, the fixed water dividing device 2 and the rotated water dividing device 3 are made from a ceramic material. Since the fixed water dividing device 2 and the rotated water dividing device 3 are closely attached and rotate relative to each other, the abrasion between the fixed water dividing device 2 and the rotated water dividing device 3 may be generally high. The abrasion resistance of the ceramic material is intended to extend the service life of the water divider.

The water divider provided by embodiments of the present disclosure controls the rotation of the rotated water dividing device through the rotation handle 7, thereby achieving the switch between water flow paths. Water enters the bottom end of the water divider shell and is divided to the top end or the side of the water divider shell, which is a flow-through structure. The water divider provided by embodiments of the present disclosure has a relatively simple structure, and has an installation direction parallel to the water supply pipe, which can be installed inside the water supply pipe to form an integrated structure. It can be applied in various applications and make heating and plumbing parts using the water divider provided by embodiments of the present utility model tidier and more aesthetically attractive.

As utilized herein, the terms "approximately," "about," "substantially," "essentially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figs. It should be noted that the orientation of various elements may differ according to other exemplary embodiments, and that such variations are intended to be encompassed by the present disclosure.

It is important to note that the construction and arrangement of the installation structure for a water pipe as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A water divider assembly, comprising:
 a water divider shell, the water divider shell including a bottom opening, a top opening, and a side opening generally aligned perpendicular relative to the bottom and top openings;
 a fixed water dividing device disposed within and fixed relative to the water divider shell, the fixed water dividing device including:
  at least one first through hole disposed between a bottom end of the fixed water dividing device and a lateral side of the fixed water dividing device generally perpendicular to the bottom end, wherein when the fixed water dividing device is disposed within the water divider shell, the lateral side of the fixed water dividing device is aligned with, and in open fluid communication with, the side opening of the water divider shell; and
  at least one second through hole disposed between a top end and the bottom end of the fixed water dividing device, wherein the first and second through holes are in separate fluid communication;

a rotated water dividing device which is disposed within the water divider shell, rotatable relative to the water divider shell, coupled to the bottom end of the fixed water dividing device, and includes at least one third through hole disposed therein, wherein when the rotated water dividing device is rotated, the third through hole is selectively aligned and in fluid communication with either the first through hole or the second through hole.

2. The water divider assembly of claim 1, further comprising a fixed base disposed above the top end of the fixed water dividing device for fixing the fixed water dividing device inside the water divider shell.

3. The water divider assembly of claim 2, further comprising a rotated base disposed below the bottom end of the rotated water dividing device for driving the rotated water dividing device to rotate inside the water divider shell.

4. The water divider assembly of claim 3, wherein the rotated base is latched to the bottom end of the rotated water dividing device, and wherein a fourth through hole is disposed between a top end and a bottom end of the rotated base.

5. The water divider assembly of claim 4, further comprising a limiting block disposed at a side of the rotated base, wherein an aperture is formed on the water divider shell and the limiting block extends through the aperture and is exposed outside of the water divider shell.

6. The water divider assembly of claim 5, further comprising a rotation handle coupled to an external surface of the water divider shell, and wherein the rotation handle is coupled to a portion of the limiting block that is exposed outside of the water divider shell.

7. The water divider assembly of claim 2, wherein the fixed base is latched to the top end of the fixed water dividing device, wherein the fixed base is latched to an inner surface of the water divider shell, and wherein a fifth through hole is disposed between a top end and a bottom end of the fixed base.

8. The water divider assembly of claim 7, wherein the water divider shell comprises a substantially hollow cylinder.

9. The water divider assembly of claim 8, wherein the rotation handle is fitted over the external of the water divider shell, and wherein a gasket is disposed at the bottom and top ends of the rotation handle.

10. The water divider assembly of claim 9, wherein the area of the water divider shell in which the rotation handle is disposed has a diameter smaller than other areas of the water divider shell, so that the surface of the rotation handle forms a smooth integral structure with the surfaces of other areas of the water divider shell.

11. The water divider assembly of claim 10, further comprising a nut disposed at the bottom end of the rotation handle for fixing the rotation handle to the external of the water divider shell, and wherein the nut is connected to the external surface of the water divider shell via threads.

12. The water divider assembly of claim 11, further comprising a water divider connector, and wherein a bottom end of the water divider connector is formed with threads, and the bottom end of the water divider connector is connected to the inner surface of the water divider shell via threads.

13. The water divider assembly of claim 12, wherein the fixed water dividing device and the rotated water dividing device are made from a ceramic material.

14. The water divider assembly of claim 13, wherein a first seal ring is disposed between the rotated water dividing device and the rotated base, a second seal ring is disposed between the fixed water dividing device and the fixed base, and a third seal ring is disposed between the nut and the water divider shell.

15. A water divider assembly, comprising:
a water divider shell which includes a bottom opening, a top opening, and a side opening generally aligned perpendicular relative to the bottom and top openings;
a fixed water dividing device received within, and fixed relative to, the water divider shell, the fixed water dividing device including:
a first through hole disposed between a bottom end of the fixed water dividing device and a lateral side of the fixed water dividing device generally perpendicular to the bottom end that corresponds to the position of the side opening of the water divider shell;
a second through hole disposed between the top and bottom openings of the fixed water dividing device, a top end through hole opening of the second through hole corresponding to the top opening of the water divider shell;
a rotated water dividing device which is coupled to the bottom end of the fixed water dividing device, rotatable relative to the water divider shell, and includes a third through hole disposed therein; and
a rotation handle coupled to an external surface of the water divider shell and used to drive the rotated water dividing device between at least two rotatable positions;
the bottom end through hole opening of the third through hole corresponding to the bottom end opening of the water divider shell, so that when the rotated water dividing device rotates between the at least two rotatable positions, the third through hole is in fluid communication with either the first through hole or open to the second through hole.

16. The water divider assembly of claim 15, further comprising a fixing device disposed at the top end of the fixed water dividing device for fixing the fixed water dividing device inside the water divider shell.

17. The water divider assembly of claim 16, further comprising a rotating device disposed at the bottom end of the rotated water dividing device for driving the rotated water dividing device to rotate inside the water divider shell, wherein the rotating device comprises: a rotated base latched to the bottom end of the rotated water dividing device, and wherein a fourth through hole is disposed between the top and bottom ends of the rotated base.

18. The water divider assembly of claim 17, further comprising a limiting block disposed at the side of the rotated base, wherein an aperture is formed on the water divider shell and the limiting block extends through the aperture and is exposed outside of the water divider shell.

19. The water divider assembly of claim 18, wherein the rotation handle is latched with the portion of the limiting block that is exposed outside of the water divider shell.

* * * * *